United States Patent
Maugé et al.

(10) Patent No.: US 12,474,192 B2
(45) Date of Patent: Nov. 18, 2025

(54) METHOD AND SYSTEM FOR DETERMINING OVER TIME A LEVEL OF A PHASE INTERFACE OF A MULTIPHASE FLUID PRESENT IN A VERTICAL PIPE

(71) Applicant: SAIPEM S.A., Montigny le Bretonneux (FR)

(72) Inventors: Rudy Maugé, Rambouillet (FR); Paul Roland, Paris (FR)

(73) Assignee: SAIPEM S.A., Montigny le Bretonneux (FR)

( * ) Notice: Subject to any disclaimer, the term of this patent is extended or adjusted under 35 U.S.C. 154(b) by 367 days.

(21) Appl. No.: 18/039,124

(22) PCT Filed: Nov. 25, 2021

(86) PCT No.: PCT/FR2021/052093
§ 371 (c)(1),
(2) Date: May 26, 2023

(87) PCT Pub. No.: WO2022/112717
PCT Pub. Date: Jun. 2, 2022

(65) Prior Publication Data
US 2024/0003729 A1 Jan. 4, 2024

(30) Foreign Application Priority Data
Nov. 30, 2020 (FR) .................................. 2012360

(51) Int. Cl.
*G01F 23/22* (2006.01)
*G01F 23/292* (2006.01)

(52) U.S. Cl.
CPC ............ *G01F 23/22* (2013.01); *G01F 23/292* (2013.01)

(58) Field of Classification Search
CPC ............... G01F 23/292; G01F 23/2922; G01F 23/2925; G01F 23/28; G01F 23/284
See application file for complete search history.

(56) References Cited

U.S. PATENT DOCUMENTS 4,544,840 A * 10/1985 Keller .................. G01F 23/292
250/227.25
6,879,425 B2 4/2005 Damm et al.
(Continued)

FOREIGN PATENT DOCUMENTS

CN 110530466 A * 12/2019 ........... G01F 23/292
EP 0385788 A2 9/1990
(Continued)

OTHER PUBLICATIONS

French Search Report from corresponding French Patent Application No. FR2012360, Jul. 13, 2021.
(Continued)

*Primary Examiner* — Herbert K Roberts
(74) *Attorney, Agent, or Firm* — Workman Nydegger

(57) ABSTRACT

A method and a system for the time determination of a phase interface level of a multiphase fluid present in a vertical pipe, include placing a distributed optical fiber sensor comprising an optical fiber cable wound in spiral around the pipe and optically coupled to a DAS interrogator, determining, from the data acquired by the DAS interrogator, the power spectral density over a predetermined duration and for each point of a discretized length of the optical fiber cable, integrating the power spectral density over a predefined frequency band for each point of the discretized length of the optical fiber cable, and setting in matrix form the results of the integration of the power spectral density in order to determine at least one interface level of the multiphase fluid.

9 Claims, 2 Drawing Sheets

(56) References Cited

U.S. PATENT DOCUMENTS

| | | | |
|---|---|---|---|
| 6,943,566 B2 | 9/2005 | Florin et al. | |
| 9,052,230 B2 * | 6/2015 | Kutlik | G01H 9/004 |
| 10,245,530 B2 | 4/2019 | Hallot | |
| 2002/0174728 A1 * | 11/2002 | Beresford | G01P 15/093 |
| | | | 73/861 |
| 2004/0025569 A1 | 2/2004 | Damm et al. | |
| 2008/0000307 A1 * | 1/2008 | Gysling | G01F 1/7086 |
| | | | 73/861.44 |
| 2013/0009048 A1 * | 1/2013 | Xie | G01V 8/22 |
| | | | 250/339.05 |
| 2014/0160888 A1 | 6/2014 | Childers et al. | |
| 2016/0146662 A1 | 5/2016 | Stokely et al. | |
| 2016/0339359 A1 | 11/2016 | Hallot | |
| 2019/0360332 A1 * | 11/2019 | Dai | G01N 21/314 |
| 2020/0011787 A1 * | 1/2020 | Dalby | G01N 33/2823 |
| 2020/0291772 A1 * | 9/2020 | Thiruvenkatanathan | |
| | | | E21B 47/18 |
| 2022/0381139 A1 * | 12/2022 | Cerrahoglu | E21B 47/07 |
| 2023/0041370 A1 * | 2/2023 | Briggs | E21B 47/01 |

FOREIGN PATENT DOCUMENTS

| | | |
|---|---|---|
| EP | 1314006 A2 | 5/2003 |
| EP | 2329234 A1 | 6/2011 |
| EP | 3111038 A1 | 1/2017 |
| WO | 2009063194 A2 | 5/2009 |
| WO | 2009100087 A1 | 8/2009 |
| WO | 2015025216 A2 | 2/2015 |
| WO | 2015114247 A1 | 8/2015 |
| WO | 2018065128 A1 | 4/2018 |
| WO | WO-2020003303 A2 * | 1/2020 ........... G01F 23/292 |

OTHER PUBLICATIONS

International Search Report from corresponding PCT Patent Application No. PCT/FR2021/052093, Feb. 22, 2022.

* cited by examiner

METHOD AND SYSTEM FOR DETERMINING OVER TIME A LEVEL OF A PHASE INTERFACE OF A MULTIPHASE FLUID PRESENT IN A VERTICAL PIPE

TECHNICAL FIELD

The invention relates to the general field of the detection of phase interfaces of a multiphase fluid circulating in vertical pipes, in particular in gravity separators or catenary risers used in the field of the production of hydrocarbons, for example petroleum and gas.

PRIOR ART

The extraction from the subsea hydrocarbon production wells generates a multiphase mixture (water, petroleum, gas and sand) that needs to be treated to recover only what will be used, namely petroleum and gas.

Generally, this multiphase mixture is taken on board an FPSO (Floating Production Storage Offloading) to be treated therein in order to separate the petroleum per se from water, gas and any solid components.

The petroleum, once separated, is then stored on board, the gas is washed then sent to the gas turbines for the production of the electricity and heat needed on board, then the surplus is reinjected into the reservoir of the oil field so as to repressurize it. The water, after having been freed from the suspended solid particles, is either discharged into the sea after extraction of any oil particles, or reinjected into the reservoir. Finally, the solid particles extracted, which represent only minimal amounts, are partly retreated and recycled on site to be discharged into the sea or into special basins, and partly sent ashore for treatment and storage and/or reinjected into the subsoil by the well.

One of the known methods for separating the water and the oil contained in the multiphase mixture extracted from the production well consists in using a reservoir of very large volume, generally cylindrical in shape: the petroleum enters at one end of the reservoir and progresses there along to allow the different phases of the mixture to separate naturally by gravity and reach the other end of the reservoir. This type of separator, hereinafter called "gravity separator", is generally used for crude petroleum also containing gas, the gas then being recovered in the upper part of the reservoir, the water and the sand in the lower part, and the petroleum (oil) in the intermediate part.

To this end, it is known to use subsea gravity separators installed on the seabed. Document WO 2015/114247 thus discloses a subsea gravity separator comprising in particular a plurality of cylindrical pipes forming reservoirs in which the multiphase mixture extracted from the production well circulates. During this circulation, the different phases of the mixture separate naturally by gravity: the water rests at the bottom of the reservoir, the oil is above the water and the gas is above the oil. At the outlet of the pipes, the water is typically recovered to be treated before being reinjected into the well by water injection pumps, while the oil and gas phases are conveyed on the surface towards the FPSO.

When the different phases of the multiphase mixture present in the reservoir of the gravity separator have separated, it is important to accurately measure the phase interface level in the reservoir, i.e. the level in the reservoir between two superimposed phases (water/oil interface and oil/gas interface). The result of this measurement makes it possible to ensure perfect regulation of the flow rate of the water injection pumps, which improves the operation of the separator.

The measurement of the phase interface level in the reservoir of a gravity separator is generally carried out by gamma-ray level sensors as described in particular in the publications EP 1,314,006 and EP 2,329,234. However, this type of sensor implements radioactive radiation sources which are detrimental to the subsea environment as well as in terms of health and safety for the staff. In addition, the detectors associated with these sensors are complex components with high cost and low reliability according to the operators, which makes the results of the measurements inaccurate.

The measurement of the phase interface level can also be carried out using an ultrasonic sensor as described in particular in the publications WO 2018/065128 and WO 2009/063194. In these publications, a sensor emits ultrasonic pulses which are reflected by the outer surface of the reservoir. The travel time of the reflected ultrasonic signal is directly proportional to the traveled distance. If the shape of the reservoir is known, the interface levels can then be deduced.

The publication U.S. Pat. No. 6,943,566 is also known, which describes the principle of level measurement which is based on the variation in the capacitance of a capacitor. With this type of measurement, the probe and the wall of the reservoir form a capacitor whose capacitance depends on the amount of fluid present in the reservoir.

Publication U.S. Pat. No. 9,052,230 is also known, which describes a method for imaging the interior volume of a container associated with an industrial process and detecting the physical and chemical characteristics of a medium present in the container, on which the industrial process acts. An example of a field of Applications is that of the coking process during which a number of undesirable conditions can occur in the container. In practice, the method detects an interface by qualitatively identifying a higher spectral energy (by visual comparison of the spectra). Above and below said interface, the energies of the spectra are weaker and have nothing remarkable that distinguishes them. The detection of the position of the interface thus lacks accuracy.

DISCLOSURE OF THE INVENTION

The object of the present invention is to propose a method making it possible to monitor in real time the phase interface level of a multiphase fluid present in a vertical pipe which does not have the drawbacks of the methods of the prior art.

In accordance with the invention, this aim is achieved thanks to a method for the time determination of a phase interface level of a multiphase fluid present in a vertical pipe, comprising:
  placing a distributed optical fiber sensor comprising an optical fiber cable wound in spiral around the pipe and optically coupled to a DAS interrogator;
  determining, from the data acquired by the DAS interrogator, the power spectral density over a predetermined duration and for each point of a discretized length of the optical fiber cable;
  integrating the power spectral density over a predefined frequency band for each point of the discretized length of the optical fiber cable; and
  setting in matrix form the results of the integration of the power spectral density in order to determine at least one interface level of the multiphase fluid.

The method according to the invention is remarkable in that it makes it possible to determine, in real time and continuously from a distributed optical fiber sensor wound around the vertical pipe, the phase interface level of the multiphase fluid present in the pipe. Furthermore, this method has the advantages of being non-intrusive for the fluid and easy to install on the vertical pipe. No maintenance is also necessary. In addition, the distributed optical fiber sensor that is used can also be used to monitor other parameters of the fluid flow, such as the pressure, the vibrations, the possible leaks, the composition, the intensity of the turbulence, etc.).

The method according to the invention is also remarkable in that it is the vertical variation of the energy, calculated from the spectral analyzes and quantified between the fluids, which makes it possible to identify the presence of one or more interfaces. In other words, for each position "in z" in the pipe (given by the fiber winding pitch) and over time t, the method according to the invention makes it possible to obtain a value which characterizes the energy behavior of the fluid. Thus, it is possible to identify the level of the interface(s) by the presence of slope break(s) in the vertical profile of the energy.

On the other hand, the spectral analyzes reveal a higher energy density in the dense fluids and thus give a remarkable and quantifiable nature to what happens above and below the interfaces. The accuracy of these analyzes makes it possible to see the influence of the hydrostatic pressure with an increase in energy due to the weight of the column of the fluids. Thus, it is possible to accurately quantify the position(s) of one or more interfaces and the thickness of an emulsion, if present. An accurate image of the distribution of the fluids is obtained.

The method according to the invention thus has numerous advantages. It allows real-time and multi-parameter monitoring from a distributed sensor, of the optical fiber type, which is wound around a gravity separator. It also makes it possible to obtain real-time images of the interfaces and of the distribution of the fluids and emulsions in a gravity separator. It also makes it possible to characterize the evolution of the physical properties of the fluids (such as water, oils, gases and critical gases) and in particular the amount of gas in liquids via an analysis of the speed of sound within each fluid (this in order to give performance elements of the separator over time). It also makes it possible to ensure parallel monitoring of the pressure all along the separator with the possibility of monitoring the evolution of the hydrostatic pressure as a function of the altitude in the separator.

According to one application of the method, the vertical pipe is a pressure apparatus of the separator type.

According to another application of the method, the vertical pipe is a catenary riser.

The integration of the power spectral density can be carried out over a frequency band comprised between 10 and 1,000 Hz. As for the measurement of the power spectral density, it can be carried out over a period on the order of 1 s.

The optical fiber cable can be spirally wound around the pipe by forming contiguous turns, which gives great accuracy in determining the phase interface level. Alternatively, the optical fiber cable can be spirally wound around the pipe by forming turns spaced from each other by the same non-zero pitch.

The method can further comprise the construction of a representative image of the matrix of the results of the integration of the power spectral density in order to visually determine at least one interface level of the multiphase fluid.

Correlatively, the object of the invention is also a system for the time determination of a phase interface level of a multiphase fluid present in a vertical pipe, comprising:
    a distributed optical fiber sensor comprising an optical fiber cable intended to be spirally wound around the pipe and a DAS interrogator optically coupled to the optical fiber cable;
    means for determining, from the data acquired from the DAS interrogator, the power spectral density over a predetermined duration and for each point of a discretized length of the optical fiber cable;
    means for integrating the power spectral density over a predefined frequency band for each point of the discretized length of the optical fiber cable; and
    means for setting in matrix form the results of the integration of the power spectral density in order to determine at least one interface level of the multiphase system.

DESCRIPTION OF THE EMBODIMENTS

The invention relates to a method and a system for the time determination of a phase interface level of a multiphase fluid present in a vertical pipe.

By "time determination", it is meant here that the phase interface level is determined as a function of time so as to be able to monitor its evolution over time.

By "multiphase fluid", it is meant here any multiphase system comprising different phases separated into several superimposed strata of an initially multiphase mixture (in particular water, gas and oil).

By "vertical pipe", it is meant here any portion of vertical pipe in which the multiphase fluid stagnates or flows. For example, the vertical pipe can be a pipe of a gravity separator or a catenary riser used in the subsea hydrocarbon production.

The method according to the invention provides for the use of the DAS (Distributed Acoustic Sensing) technology to determine the interface levels of a multiphase fluid present in such a vertical pipe.

The optical fiber distributed acoustic sensing (DAS) is a known type of sensing in which an optical fiber is deployed as the sensing fiber to provide the detection of the acoustic activity along its entire length. Typically, one or more laser pulses are sent through the optical fiber, and by analyzing the backscattered radiation, the fiber can be divided into a plurality of discrete sensing portions which may be contiguous.

In each discrete sensing portion, mechanical disturbances of the optical fiber, for example deformations due to incident acoustic waves, cause a variation in the properties of the radiation which is backscattered from this detection portion.

This variation can be detected and analyzed and used to give a measurement of the disturbance of the fiber at the level of this detection portion.

Figure 1:
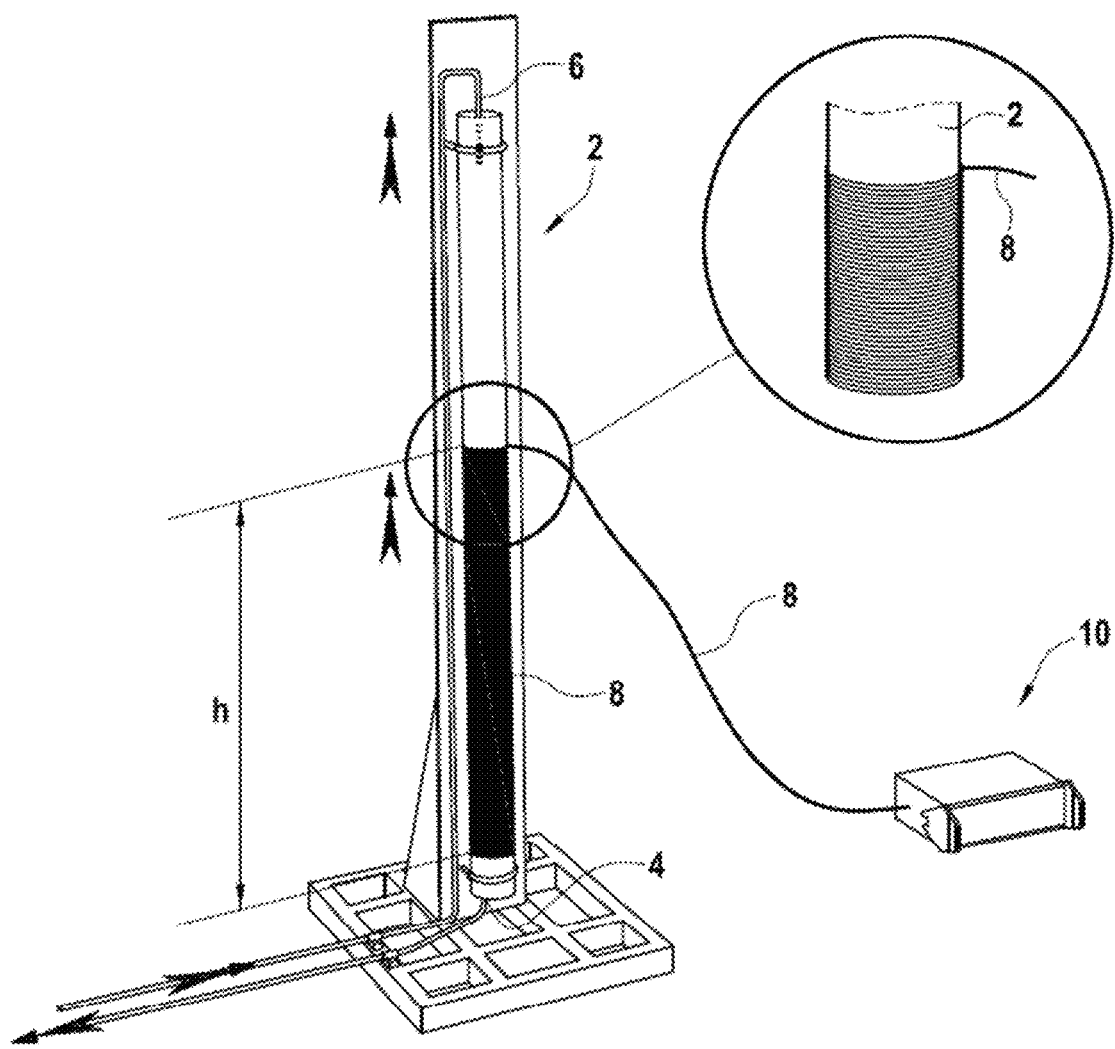
FIG. 1 is a schematic view of an example of a vertical pipe equipped with a system according to the invention for the time determination of a phase interface level of a multiphase fluid flowing in the pipe.

FIG. 1 schematically represents an example of application of the method according to the invention to a vertical pipe 2 inside which a multiphase fluid flows from top to bottom.

In this example of application, the pipe 2 is closed at its lower end by a plug provided with a drain outlet 4 for the multiphase fluid. The entry of the multiphase fluid is carried out by the top of the pipe by a pipe 6. Taps (not represented) make it possible to control the flow rates of fluid entering and leaving the pipe 2.

An optical fiber cable 8 is spirally wound and glued around the pipe 2 from its bottom over a height h of about 85 cm. The optical fiber is wound by forming contiguous turns (the pitch between the adjacent turns is zero) and is optically coupled to a DAS interrogator 10.

Of course, depending on the measurement accuracy desired for the phase interface level, it is possible to wind the optical fiber cable so that it forms turns spaced from each other by the same non-zero pitch. The greater the pitch, the less the measurement accuracy will be.

Similarly, the accuracy of the measurement also depends on the spatial discretization chosen for the optical fiber. In the example illustrated, a spatial discretization of the optical fiber of 1 m is chosen, which corresponds to a vertical spatial resolution along the pipe of about 3 mm (the optical fiber cable here having a diameter of 0.9 mm).

Moreover, a reference of 0% of the height of the optical fiber for the bottom of the pipe 2, a reference of 50% of the height of the optical fiber for the middle of the pipe and a reference of 100% of the height of the optical fiber for the top of the pipe, are chosen for this application.

The multiphase fluid which is circulated in the pipe 2 from top to bottom is here a liquid/gas mixture consisting of water and air.

The method according to the invention provides, from the raw data acquired by the interrogator 10 coupled to the optical fiber, to determine the power spectral density over a predetermined duration and for each point of the discretized length of the optical fiber cable.

Figure 2A:
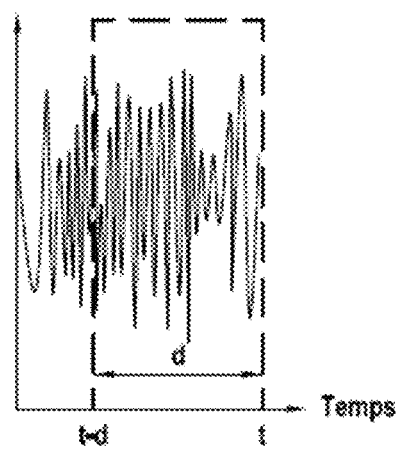
FIG. 2A shows an example of implementation of a step of the method according to the invention.

The raw data acquired by the DAS interrogator are the time variations of the optical fiber deformation. These data make it possible to calculate the power spectral density over a predetermined duration d (typically in the order of the second) as represented in FIG. 2A. This calculation is carried out all along the optical fiber for each discretized point i of the latter. In a known manner, the power spectral density is obtained by the calculation of the square of the modulus of the Fourier transform of the deformation of the optical fiber at the point i, multiplied by the integration time d.

Figure 2B:
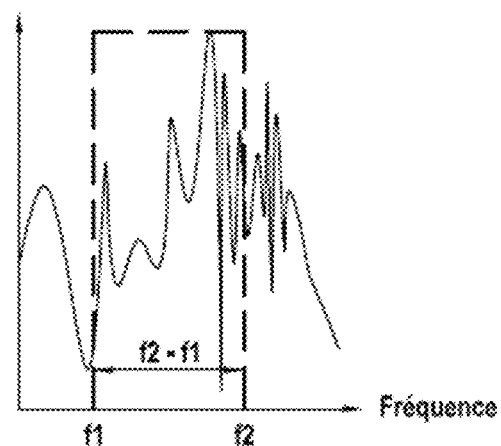
FIG. 2B shows an example of implementation of another step of the method according to the invention.

The next step of the method according to the invention consists in integrating the power spectral density thus calculated over a predefined frequency band f1, f2 (typically comprised between 10 and 1,000 Hz) for each point i of the discretized length of the optical fiber cable. This integration is represented by the curve of FIG. 2B.

The results of the integration of the power spectral densities over the entire length of the optical fiber are then stored in the form of the same 2D matrix in order to be visualized.

The method according to the invention can then provide for the construction of an image representative of this matrix of the results of the integration of the power spectral densities in order to be able to visually determine the interface levels of the multiphase fluid.

Figure 2C:
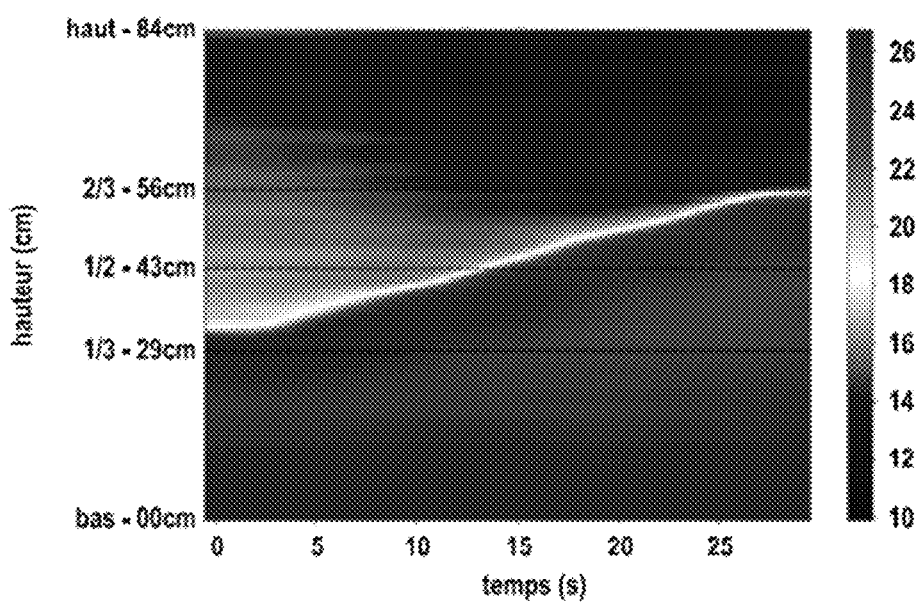
FIG. 2C shows an example of implementation of yet another step of the method according to the invention.

An example of a graphical representation of the matrix of the results of the integration of the power spectral densities is illustrated in FIG. 2C.

In this figure, the abscissa axis represents the time (here in seconds from t=0 s to t=30 s) and the ordinate axis characterizes the height h (here in cm from 0 cm to 85 cm) on the vertical pipe of the wound optical fiber. The color is associated with the intensity of the power spectral density (according to a scaling algorithm).

This figure thus makes it possible to easily visualize the time evolution of the water/air phase interface of the multiphase mixture flowing in the vertical pipe of FIG. 1. Indeed, this phase interface is materialized in this FIG. 2C by the limit between the two colors (it is here about 30 cm high at t=0 s to reach about 56 cm at t=30 s).

It can be seen here that the phase interface level varies as a function of time. It could of course be substantially constant over time.

Moreover, the time determination of the phase interface level was obtained here from a graphical representation of the matrix of the results of the integration of the power spectral densities.

Alternatively, it is possible to provide that an algorithm makes it possible, from the matrix, to directly determine and monitor the evolution of the phase interface levels as a function of time.

The invention claimed is:

1. A method for the time determination of a phase interface level of a multiphase fluid present in a vertical pipe, comprising:
   placing a distributed optical fiber sensor comprising an optical fiber cable wound in a spiral around the pipe and optically coupled to a DAS interrogator;
   determining, from the data acquired by the DAS interrogator, the power spectral density over a predetermined duration and for each point of a discretized length of the optical fiber cable;
   integrating the power spectral density over a predefined frequency band for each point of the discretized length of the optical fiber cable; and
   setting the results of the integration of the power spectral density in matrix form in order to determine at least one interface level of the multiphase fluid.

2. The method according to claim 1, wherein the vertical pipe is a pressure apparatus of the separator type.

3. The method according to claim 1, wherein the vertical pipe is a catenary riser.

4. The method according to claim 1, wherein the integration of the power spectral density is carried out over a frequency band comprised between 10 and 1,000 Hz.

5. The method according to claim 1, wherein the measurement of the power spectral density is carried out over a period of the order of 1s.

6. The method according to claim 1, wherein the optical fiber cable is spirally wound around the pipe by forming contiguous turns.

7. The method according to claim 1, wherein the optical fiber cable is spirally wound around the pipe by forming turns spaced from each other by the same non-zero pitch.

8. The method according to claim 1, further comprising the construction of a representative image of the matrix of the results of the integration of the power spectral density in order to visually determine at least one interface level of multiphase fluid.

9. A system for the time determination of a phase interface level of a multiphase fluid present in a vertical pipe, comprising:

a distributed optical fiber sensor comprising an optical fiber cable spirally wound around the pipe and a DAS interrogator optically coupled to the optical fiber cable;

means for determining, from the data acquired from the DAS interrogator, the power spectral density over a predetermined duration and for each point of a discretized length of the optical fiber cable;

means for integrating the power spectral density over a predefined frequency band for each point of the discretized length of the optical fiber cable; and means for setting in matrix form the results of the integration of the power spectral density in order to determine at least one interface level of the multiphase system.

* * * * *